UNITED STATES PATENT OFFICE.

WILLIAM LOEHR, OF BLOOMINGTON, CALIFORNIA.

PROCESS OF TREATING FIBROUS PLANTS FOR THE RECOVERY OF FIBER.

1,330,127.     Specification of Letters Patent.     Patented Feb. 10, 1920.

No Drawing.     Application filed May 28, 1919. Serial No. 300,423.

*To all whom it may concern:*

Be it known that I, WILLIAM LOEHR, a citizen of the United States, residing at Bloomington, in the county of San Bernardino and State of California, have invented new and useful Improvements in Processes of Treating Fibrous Plants for the Recovery of Fiber, of which the following is a specification.

My invention relates to a process of treating fibrous plants to extract the fiber therefrom.

It is an object of this invention to devise a simple, efficient and inexpensive process whereby fibrous plants, such as yucca, may be treated and the fiber therefrom extracted.

It has been found that the yucca plant contains a vegetable fiber of excellent quality, suitable for use as manila, sisal, etc., but the process of treating the same and separating therefrom the bass fiber has been laborious and expensive.

My new process overcomes the defects of the old methods and my invention consists in the steps of the process hereinafter described and claimed.

The leaves of the yucca plant are passed through crushing rollers of any suitable kind, which break the leaves so as to prepare them for the next step in the operation, which is the boiling process. The leaves are boiled from four to five minutes in a ten per cent. potash lye solution under atmospheric pressure, which renders the cellular tissues mushy and slimy. The vegetable material is now washed with a half per cent. solution of alum, which serves to neutralize any lye that the vegetable mass may still contain.

The next step is to wash the mass in clear cold water. The boiling and washing disintegrates and removes the cellular tissue and leaves the fiber practically clean. It is now taken out of the water, shaken, and dried slowly.

Various changes may be made by those skilled in the art without departing from the spirit of my invention as claimed.

I claim:

1. A process of separating and extracting vegetable fiber from yucca plants and the like, comprising crushing the plants, boiling the same in a lye solution until the cellular tissue is softened, treating the plants with a diluted solution of alum, washing in cold water, shaking the fiber and drying the same.

2. A process of separating and extracting vegetable fiber from yucca plants and the like, comprising crushing the plants, boiling the same in a ten per cent. lye solution until the cellular tissue is softened, neutralizing the lye in the plants by means of a diluted solution of alum, washing the fibers in water, shaking them, and allowing them to dry.

In testimony whereof I have signed my name to this specification.

WM. LOEHR.